(12) United States Patent
Huang et al.

(10) Patent No.: US 11,277,675 B2
(45) Date of Patent: Mar. 15, 2022

(54) METHOD AND APPARATUS FOR MONITORING THE INTERACTION BETWEEN SURROUNDING ROCKS AND TBM IN TBM TUNNELING PROCESS

(71) Applicants: Institute of Rock and Soil Mechanics, Chinese Academy of Sciences, Wuhan (CN); Wuhan University, Wuhan (CN)

(72) Inventors: Xing Huang, Wuhan (CN); Quansheng Liu, Wuhan (CN); Tao Huang, Wuchang District (CN); Shaohua Wang, Wuhan (CN); Bin Liu, Wuhan (CN); He Liu, Wuhan (CN)

( * ) Notice: Subject to any disclaimer, the term of this patent is extended or adjusted under 35 U.S.C. 154(b) by 286 days.

(21) Appl. No.: 16/508,316

(22) Filed: Jul. 11, 2019

(65) Prior Publication Data

US 2020/0267456 A1 Aug. 20, 2020

(30) Foreign Application Priority Data

Feb. 18, 2019 (CN) .......................... 201910120933.7

(51) Int. Cl.
*H04Q 9/00* (2006.01)
*E21D 9/00* (2006.01)
*H04W 4/38* (2018.01)

(52) U.S. Cl.
CPC .............. *H04Q 9/00* (2013.01); *E21D 9/003* (2013.01); *H04Q 2209/84* (2013.01); *H04Q 2213/107* (2013.01); *H04W 4/38* (2018.02)

(58) Field of Classification Search
CPC ................. H04Q 9/00; H04Q 2209/84; H04Q 2213/107; E21D 9/003; H04W 4/38
See application file for complete search history.

(56) References Cited

U.S. PATENT DOCUMENTS

2015/0233242 A1* 8/2015 Li ........................... E21D 9/003
 342/22
2018/0156031 A1* 6/2018 Tran ...................... E21B 47/135
(Continued)

FOREIGN PATENT DOCUMENTS

CN 105952465 A 9/2016
CN 107420105 A 12/2017
(Continued)

OTHER PUBLICATIONS

First Office Action; CN201910120933.7; dated Dec. 4, 2019.
(Continued)

*Primary Examiner* — Amine Benlagsir
(74) *Attorney, Agent, or Firm* — Patshegen IP LLC; Moshe Pinchas (57) ABSTRACT

Provided is a method and an apparatus for real-time monitoring interaction between surrounding rocks and the TBM in a TBM tunneling process. Interaction between target objects is monitored by one or more sensors to obtain test data. A first electronic device connects a collecting module with the one or more sensors through a communication serial interface of the one or more sensors. A connection state between the one or more sensors and the collecting module is judged. The connection abnormality information is recorded or the collection parameters according to the connection state are set. The first electronic device judges the collection state by monitoring the collection, and records collection abnormality information or performs one-time collection of data according to the collection state. The first electronic device stores the data in a first storage folder. A second electronic device analyzes the data, and transmits the data to a monitoring device.

9 Claims, 5 Drawing Sheets

(56) References Cited

U.S. PATENT DOCUMENTS

| | | | |
|---|---|---|---|
| 2018/0258765 A1* | 9/2018 | Okada | G01L 1/22 |
| 2019/0112924 A1* | 4/2019 | Kawai | E21D 9/104 |
| 2019/0120992 A1* | 4/2019 | Stove | G01V 3/12 |
| 2020/0011176 A1* | 1/2020 | Huo | E21D 9/003 |
| 2020/0269435 A1* | 8/2020 | Huo | E21D 9/104 |
| 2020/0277847 A1* | 9/2020 | Rojas | H04L 63/029 |

FOREIGN PATENT DOCUMENTS

| | | | |
|---|---|---|---|
| CN | 107607082 A | * | 1/2018 |
| CN | 107607082 A | | 10/2018 |

OTHER PUBLICATIONS

Second Office Action; CN201910120933.7; dated Mar. 16, 2020.
Third Office Action; CN201910120933.7; dated Jul. 17, 2020.
Search Report; CN2019101209337; dated Nov. 12, 2019.

* cited by examiner

METHOD AND APPARATUS FOR MONITORING THE INTERACTION BETWEEN SURROUNDING ROCKS AND TBM IN TBM TUNNELING PROCESS

CROSS-REFERENCE TO RELATED APPLICATIONS

The present application claims the priority of the Chinese patent application No. 201910120933.7, filed with the Chinese Patent Office on Feb. 18, 2019, and entitled "Method and Apparatus for Monitoring the Interaction between Surrounding Rocks and TBM in TBM Tunneling Processes", which is incorporated herein by reference in its entirety.

TECHNICAL FIELD

The present disclosure relates to the technical field of tunneling construction by full-face tunnel boring machine (TBM for short), particularly to a method and an apparatus for monitoring the interaction between surrounding rocks and the TBM in a TBM tunneling processes.

BACKGROUND ART

When advancing through soft and weak surrounding rocks with large burial depth, during the tunneling or maintenance processes of a shield TBM, the convergence of the surrounding rocks in the shield region may exceed the excavation over-gap between the surrounding rocks and the shield, and then contact and squeeze the shield. If the resulted interaction force (a frictional resistance) is greater than the thrusting force provided by oil cylinders of the TBM, the machine will be jammed. The longer the downtime is, the greater the deformation of the surrounding rocks is, and the greater squeezing forces on the shield are, thus causing more serious jamming.

Besides, when a cutter-head bores into complex grounds or advances through an interface on which the lithology changes, if the TBM tunneling parameters are not adjusted timely, it easily causes considerable cutter-head vibration, thus aggravating the cutters wear, increasing the cutter changing frequency, and even causing rupture of the main bearing.

Currently, measures are usually adopted passively after occurrences of TBM entrapment, and there is no really efficient treatment measure yet, thus it is likely to result in long-term shutdown and damages to the TBM device. From the mechanical essence, a TBM tunneling process is just a "rock-machine interaction process", and it is hard to achieve, with the prior art, real-time monitoring of the rock-machine interaction in the TBMs tunneling process.

SUMMARY

Embodiments of the present disclosure provide a method and an apparatus for monitoring the interaction between surrounding rocks and the TBM in a TBM tunneling process, wherein the method includes:

monitoring, by one or more sensors, interaction between target objects, to obtain test data, wherein the test data include data of squeezing forces that the surrounding rocks apply on the shield and vibration acceleration velocities of the cutter-head boring the rocks at tunnel face;

a first electronic device connecting a collecting module with the one or more sensors through a communication serial interface of the one or more sensors, wherein the first electronic device is provided in a tunnel;

the first electronic device judging a connection state between the one or more sensors and the collecting module;

the first electronic device recording connection abnormality information or setting collection parameters according to the connection state;

the first electronic device judging a collection state by monitoring a collecting process;

the first electronic device recording collection abnormality information or performing one-time collection of data according to the collection state;

the first electronic device storing the data of the one-time collection in a first storage folder; and the second electronic device analyzing the data of the squeezing forces to judge a jamming probability, and transmitting the vibration acceleration velocities, the data of the squeezing forces, and the jamming probability to a monitoring device.

Embodiments of the present disclosure provide an apparatus for monitoring the interaction between surrounding rocks and the TBM in a TBM tunneling process, wherein the apparatus includes:

a monitoring module, configured to monitor the interaction between target objects by one or more sensors to obtain test data, wherein the test data includes data of squeezing forces that the surrounding rocks apply to a shield and vibration acceleration velocities of a cutter-head boring the rocks at a tunnel face;

a connecting module, configured for a first electronic device to connect a collecting module with the one or more sensors through a communication serial interface of the one or more sensors, wherein the first electronic device is provided in a tunnel;

a first judging module, configured for the first electronic device to judge a connection state between the one or more sensors and the collecting module;

a first recording module, configured for the first electronic device to record connection abnormality information or set collection parameters according to the connection state;

a second judging module, configured for the first electronic device to judge the collection state by monitoring a collecting process;

a second recording module, configured for the first electronic device to record collection abnormality information or perform one-time collection of data according to the collection state;

a storing module, configured for the first electronic device to store the data of the one-time collection in a first storage folder; and an analyzing module, configured for the second electronic device to analyze the data of the squeezing forces to judge a jamming probability, and transmit the vibration acceleration velocities, the data of the squeezing forces, and the jamming probability to a monitoring device.

Embodiments of the present disclosure provide an electronic device, including a storage, and a processor, wherein the storage stores a computer program executable on the processor, and the processor implements the steps of the method for monitoring the interaction between surrounding rocks and the TBM in a TBM tunneling process as described in the present disclosure by executing the computer program.

BRIEF DESCRIPTION OF DRAWINGS

In order to more clearly illustrate technical solutions in detailed embodiments of the present disclosure or the prior art, accompanying drawings which are needed to be used for description of the detailed embodiments or the prior art will be introduced briefly below. Apparently, the accompanying drawings in the description below merely show some embodiments of the present disclosure. A person ordinarily skilled in the art still can obtain other accompanying drawings in light of these accompanying drawings without inventive efforts.

Reference signs: 10—monitoring module; 20—connecting module; 30—first judging module; 40—first recording module; 50—second judging module; 60—second recording module; 70—storing module; 80—analyzing module; 90—sensor; 100—shield; 101—surface strain gauge; 102—miniature pressure cell; 200—electronic device; 201—storage; 202—processor; 203—bus; and 204—communication interface.

DETAILED DESCRIPTION OF EMBODIMENTS

In order to make objects, technical solutions, and advantages of embodiments of the present disclosure clearer, below the technical solutions in the present disclosure will be described clearly and completely in conjunction with accompanying drawings, and apparently, some but not all embodiments of the present disclosure are described. All other embodiments, obtained by a person ordinarily skilled in the art based on the embodiments of the present disclosure without inventive efforts, shall fall into the scope of protection of the present disclosure.

At present, during tunneling and maintenance processes of a TBM, data of squeezing forces of surrounding rocks on a shield cannot be monitored in real time, and a probability of occurrence of shield jamming accidents cannot be predicted, thus not being able to take measures in advance. Besides, the situation of cutter-head vibration cannot be monitored in real time during the tunneling process, either, thus the cutters wear may be aggravated, and even the main bearing may be damaged. Therefore, it is hard to achieve, with the prior art, real-time monitoring for rock-machine interaction in the TBM tunneling process.

In view of this, embodiments of the present disclosure provide a method and an apparatus for monitoring the interaction between surrounding rocks and the TBM in a TBM tunneling process, which can solve the technical problem existing in the prior art that it is hard to achieve real-time monitoring for the rock-machine interaction in the TBM tunneling process.

In view of this, an object of the present disclosure includes, for example, providing a method and an apparatus for monitoring interaction between surrounding rocks and the TBM in a TBM tunneling process, so as to solve the technical problem existing in the prior art that it is hard to achieve real-time monitoring of the rock-machine interaction in the TBM tunneling process.

In one or more embodiments, the test data further includes tunneling parameters of the TBM, tunneling chainage, and geological conditions.

In one or more embodiments, the step of the first electronic device recording connection abnormality information or setting collection parameters according to the connection state includes:

the first electronic device recording, if the connection is failed, information that the connection is failed, wherein the information includes: at least one from a serial number of a communication serial interface where the connection is failed, a screenshot of a running interface of the collecting module, and time of the failed connection; or the first electronic device setting the first storage folder, one-time collection duration, and a collection frequency if the connection is successful.

In one or more embodiments, the step of the first electronic device recording connection abnormality information or setting collection parameters according to the connection state includes:

the first electronic device recording information that the connection is failed, if connection abnormality occurs and the connection is still unsuccessful after a program tries to reconnect the one or more sensors with the collecting module 3 times, wherein the information includes: at least one from a serial number of a communication serial interface where the connection is failed, a screenshot of a running interface of the collecting module, and time of the failed connection; or the first electronic device setting the first storage folder, one-time collection duration, and a collection frequency if the connection is successful.

As described above, functions of automatic failure correction and failure message recording are achieved.

In one or more embodiments, the step of the first electronic device recording collection abnormality information or performing data collection according to the collection state includes:

the first electronic device recording the collection abnormality information if collection abnormality occurs, wherein the abnormality information includes: at least one from a screenshot of a running interface of the collecting module, a serial number of the one or more sensors, and the occurrence time of the collection abnormality;

the first electronic device restarting the collecting module; and the first electronic device performing the one-time collection according to the one-time collection duration to obtain data of the one-time collection if there is no abnormality in the collecting process.

In one or more embodiments, the method further includes:

the first electronic device and the second electronic device running a remote control module;

connecting the first electronic device with the second electronic device via a junctor, and judging the connection state;

the first electronic device recording information that the connection is failed if the connection is failed, wherein the information includes at least one from occurrence time of failed connection and a screenshot of a running interface of the remote control module;

the first electronic device and the second electronic device restarting the remote control module;

the second electronic device setting a second storage folder therein if the connection is successful; and the second electronic device storing the test data in the second storage folder.

In one or more embodiments, the junctor includes: a switch and a TBM optical fiber communication system;

the first electronic device and the second electronic device are connected via the switch and the TBM optical fiber communication system; and IP addresses of the first electronic device and of the second electronic device are set on the same network segment, and the IP addresses of the first electronic device and of the second electronic device are different in the last three bits.

In one or more embodiments, the method further includes:

the first electronic device setting a first account and a first password of the remote control module according to a user input, and the second electronic device setting a second account and a first password of the remote control module according to a user input;

connecting the second electronic device with a user side according to the second account and the second password, such that the user side accesses and controls the second electronic device via the second account and the second password; and connecting the first electronic device with the user side according to the first account and the first password, such that the user side accesses and controls the first electronic device via the first account and the first password.

In one or more embodiments, the apparatus further includes sensors;

the sensors include one or more sensors for the interaction between the surrounding rocks and the shield and one or more sensors for interaction between the cutter-head and the rocks at the tunnel face, wherein the one or more sensors for the interaction between the surrounding rocks and the shield includes at least two surface strain gauges or at least one miniature pressure cell, and the one or more sensors for the interaction between the cutter-head and the rocks at the tunnel face is at least a cutter-head vibration sensor;

the at least two surface strain gauges are provided on the inner surface of a shield in a mode of arrayed distribution to reflect the squeezing forces that the surrounding rock acts on the shield;

the at least one miniature pressure cell is provided on the outer surface of a shield, so as to directly measure the squeezing forces that the surrounding rocks apply to the shield; and the cutter-head vibration sensor is provided at the back side of the cutter-head.

The technical solutions provided in the embodiments of the present disclosure bring about at least the following beneficial effects: the embodiments of the present disclosure provide the method and the apparatus for monitoring the interaction between surrounding rocks and the TBM in a TBM tunneling process. Firstly, the interaction between the target objects is monitored by the one or more sensors to obtain the test data, wherein the test data includes the data of the squeezing forces that the surrounding rocks apply on the shield and the vibration acceleration velocities of the cutter-head boring the rocks at the tunnel face, then the first electronic device connects the collecting module with the sensors through the communication serial interface of the sensors, wherein the first electronic device is provided in the tunnel, the first electronic device judges the connection state between the sensors and the collecting module, the first electronic device records the connection abnormality information or sets the collection parameters according to the connection state, thereafter, the first electronic device judges the collection state by monitoring the collecting process, and the first electronic device records collection abnormality information or performs one-time collection of data according to the collection state, the first electronic device stores the one-time collection data in the first storage folder, and finally, the second electronic device analyzes the data of the squeezing forces to judge the shield jamming probability, and transmits the vibration acceleration velocities, the data of the squeezing forces, and the shield jamming probability to the monitoring device. By adopting an autorun monitoring software, automatic storage and automatic transmission of the test data, and autoalarm in cases of software running failure are achieved, and the test data can be transmitted to the electronic device outside the tunnel at regular intervals, further, the electronic device outside the tunnel analyzes and predicts the TBM jamming probability according to the test data, and adjusts the tunneling parameters of the TBM, so as to solve the technical problem existing in the prior art that it is hard to achieve real-time monitoring for the rock-machine interaction in the TBM tunneling process.

Other features and advantages of the present disclosure will be illustrated in the following description, and partially become obvious from the description, or understood by implementing the present disclosure. The objects and other advantages of the present disclosure are achieved and obtained through structures specifically indicated in the description, the claims, and the accompanying drawings.

In order to make the above objects, features, and advantages of the present disclosure more apparent and understandable, preferred embodiments are particularly illustrated below and detailed description is made in combination with attached accompanying drawings as follows.

In order to facilitate understanding the present embodiment, firstly, the method and the apparatus for monitoring interaction between surrounding rocks and the TBM in a TBM tunneling process disclosed in the embodiments of the present disclosure are introduced in detail.

Embodiment 1

Figure 1:
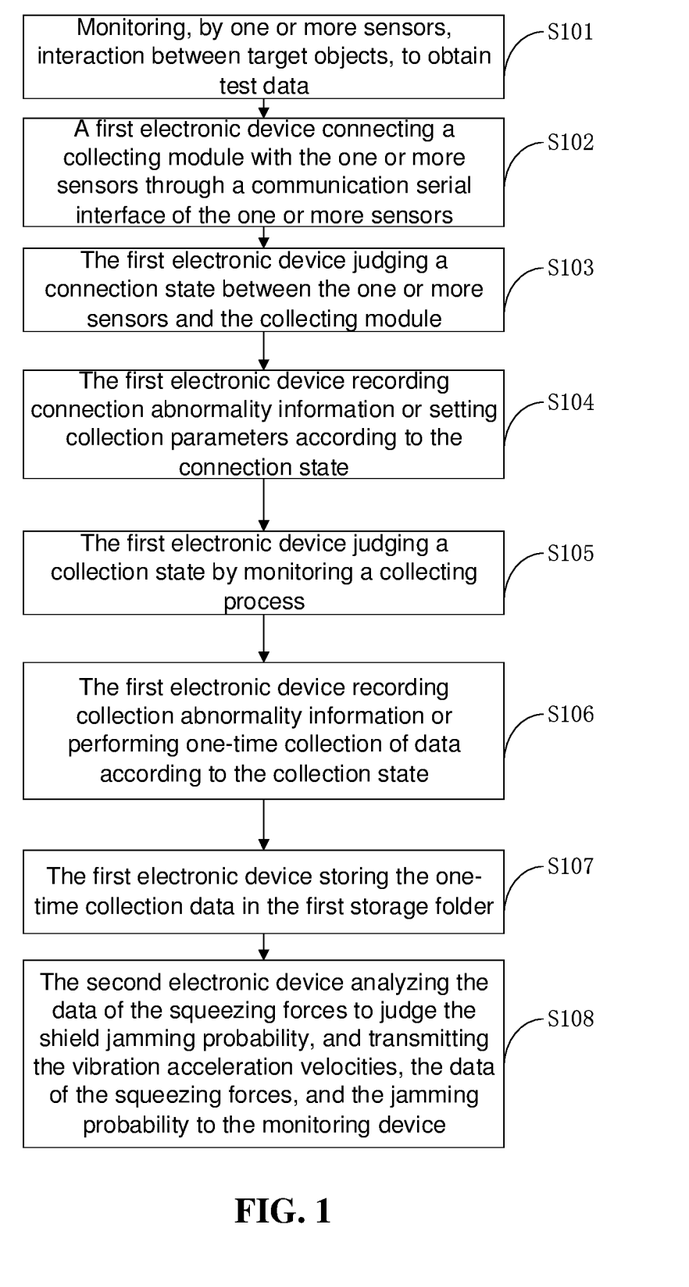
FIG. 1 is a flowchart of a method for monitoring the interaction between surrounding rocks and the TBM in a TBM tunneling process provided in an embodiment of the present disclosure.

FIG. 1 is a flowchart of a method for monitoring the interaction between surrounding rocks and the TBM in a tunnel boring machine (TBM) tunneling process provided in Embodiment 1 of the present disclosure.

Referring to FIG. 1, the method includes following steps:

Step S101, monitoring, by one or more sensors, interaction between target objects, to obtain test data, wherein the test data includes data of squeezing forces of surrounding rocks on a shield and the vibration accelerated velocity of a cutter-head boring rocks at the tunnel face.

In the present embodiment, the target objects include the surrounding rocks, the shield, the cutter-head, and the rocks at the tunnel face, and the test data further includes tunneling parameters of the TBM, tunneling chainage, and geological conditions.

Step S102, a first electronic device connecting a collecting module with the one or more sensors through a communication serial interface of the one or more sensors, wherein the first electronic device is provided in a tunnel.

For testing the squeezing forces of surrounding rocks on a shield, traditionally, an operator physically goes into the tunnel and uses a hand-held reader to read the reading of one or more sensors testing the squeezing forces that the surrounding rocks apply on the shield, which is time-consuming and effort-consuming, and only can collect one set of data each time, but can hardly achieve real-time collection. In the present embodiment, in order to achieve real-time monitoring for the interaction between the surrounding rocks and the shield, the original hand-held reader now has been modified into the following readers: a real-time vibrating-wire data collector/a grating demodulator and a DataTaker data collector, mounted between a terminal end of the shield and an operating room of the TBM, and the sensors are connected with the reader through a data cable.

As to testing the cutter-head vibration, traditionally, a computer is placed at a place relatively close to the cutter-head when the TBM bores, and wirelessly connected with a cutter-head vibration sensor via a wireless gateway, to record the tunneling parameters and vibration data of the cutter-head when the TBM bores. But in this mode, a sensor's wireless signal is quite likely to be shielded, and numerous dust and large noise in TBM tunneling result in harsh working environments for a monitoring person, and likewise, only when the monitoring person is at the site, can the monitoring be carried out. That is, only when the monitoring person goes into the tunnel, the monitoring can be carried out. It is hard to achieve real-time monitoring and long-term monitoring. In order to realize that the cutter-head vibration signals can be monitored in real time once the TBM bores, the wireless gateway, supporting a wireless acceleration sensor and based on a ZigBee module, is mounted in a place of the cutter-head close to the excavation chamber of the TBM, where it is not easily disturbed. The gateway receives cutter-head vibration wireless signals emitted by the acceleration sensor. The wireless gateway is connected with the monitoring computer through a USB data cable for reading the monitoring data.

In the present embodiment, the first electronic device refers to a computer PC1 inside a tunnel, and the collecting module refers to automatic monitoring software. The computer PC1 is placed in the operating room of the TBM (due to the limited space, usually a tablet computer is placed). The monitoring software for interaction between the surrounding rocks and the shield and the cutter-head vibration is mounted. The reader and the wireless gateway receiving the cutter-head vibration signal are connected with the computer through USB data cables, and the USB data cable is also used to supply power to the wireless gateway. When the reader or the wireless gateway is relatively far from the computer, a USB extension cable (with a charging voltage of 5 V) having charging and amplification functions can be added therebetween; if the distance between the reader or the wireless gateway and the computer is greater than 50 m, a network cable may be considered to be used therebetween, reducing data loss, and two ends of the network cable are connected with USB cables using USB-to-network cable interfaces.

In the present embodiment, unattended programs "Real-time monitoring program for the interaction between sur-rounding rock and shield" and "Real-time monitoring for the cutter-head vibration" enabling automatic running the monitoring software and autoalarm for software monitoring failure are compiled using RoboTask software based on VB language, realizing automatic and timed running of the monitoring software and data download and storage. Alternatively, when the monitoring software runs wrong, the programs automatically try to reconnect the collecting module with the sensors three times, and when the connection is still unsuccessful, then the programs automatically record and feed back a failure type, failure description (for example, failed sensor connection, over-low sensor voltage), and occurrence time of the failure.

Specifically, new Tasks "Real-time monitoring for the interaction between surrounding rock and shield" and "Real-time monitoring for the cutter-head vibration" are created, and when the unattended automatic monitoring software is started, the unattended automatic monitoring software automatically starts the collection software of the sensor. In the present embodiment, a vibrating-wire reading software is BGK, and the cutter-head vibration monitoring software is BeeData.

A serial number of a serial interface of the one or more sensors connected to the computer is automatically recognized via a program, the serial number of the serial interface is selected as a connecting serial interface, and the one or more sensors are automatically connected with collecting software through the serial interface.

Step S103, the first electronic device judging a connection state between the one or more sensors and the collecting module.

Step S104, the first electronic device recording connection abnormality information or setting collection parameters according to the connection state.

Figure 2:
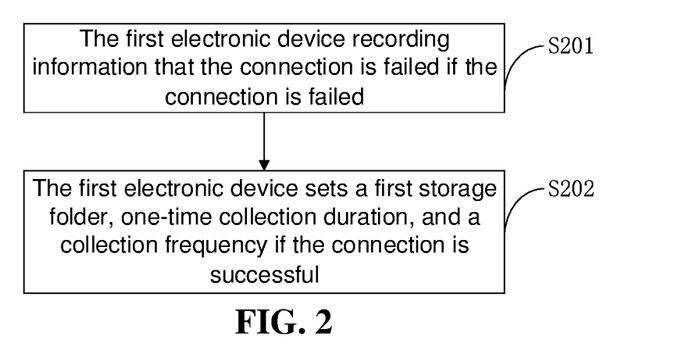
FIG. 2 is a flowchart of step S104 in the method for monitoring the interaction between surrounding rocks and the TBM in a TBM tunneling process provided in the embodiment of the present disclosure.

Referring to FIG. 2, step S104 includes following steps:

Step S201, the first electronic device recording information that the connection is failed if the connection is failed, wherein the information includes: at least one from a serial number of a communication serial interface where the connection is failed, a screenshot of a running interface of the collecting module, and time of failed connection.

Specifically, if the one or more sensors fail to be connected with the collecting software, the computer PC1 inside the tunnel records information that the current connection is failed, including a serial number of a serial interface where the connection is failed, connection time, a monitoring interface screenshot, etc., and meanwhile creates a file "Monitoring Failure.txt", to add failure information to this file when a monitoring failure occurs every time subsequently. When the connection is failed, the monitoring software program is restarted.

Step S202, the first electronic device sets a first storage folder, one-time collection duration, and a collection frequency if the connection is successful.

In the present embodiment, a storage address is automatically set via a program, wherein a storage address for the strain data collected by the BGK is "D:\BGK shield strain data"; a storage address for the acceleration data collected by the cutter-head vibration sensor is "D:\BeeData vibration data".

Specifically, a collection frequency of the strain data from the BGK is one time per 3 min, and an one-time collection duration is set as 12 h; a collection frequency of the acceleration data from the cutter-head vibration sensor is 500 Hz, and one-time collection duration is set as 2 h.

Step S105, the first electronic device judging a collection state by monitoring a collecting process.

Step S106, the first electronic device recording collection abnormality information or performing one-time collection of data according to the collection state.

Figure 3:
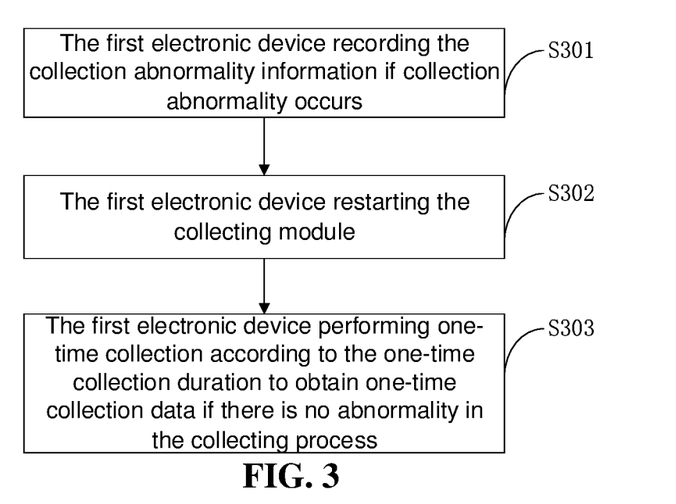
FIG. 3 is a flowchart of step S106 in the method for monitoring the interaction between surrounding rocks and the TBM in a TBM tunneling process provided in the embodiment of the present disclosure.

Referring to FIG. 3, step S106 includes following steps:

Step S301, the first electronic device recording the collection abnormality information if collection abnormality occurs, wherein the abnormality information includes: at least one from a screenshot of a running interface of the collecting module, a serial number of the one or more sensors, and occurrence time of the collection abnormality.

Step S302, the first electronic device restarting the collecting module.

Step S303, the first electronic device performing one-time collection according to the one-time collection duration to obtain one-time collection data if there is no abnormality in the collecting process.

Step S107, the first electronic device storing the one-time collection data in the first storage folder.

Specifically, the strain data collected by the BGK is stored in the storage folder "D:\BGK shield strain data" in the computer PC1 inside the tunnel; the acceleration data collected by the cutter-head vibration sensor is stored in the folder "D:\BeeData vibration data" in the computer PC1 inside the tunnel.

Step S108, the second electronic device analyzing the data of the squeezing forces to judge the shield jamming probability, and transmitting the vibration acceleration velocities, the data of the squeezing forces, and the jamming probability to the monitoring device.

In the present embodiment, the second electronic device refers to a computer PC2 outside the tunnel, provided outside the tunnel. The computer PC2 outside the tunnel adjusts the tunneling parameters by analyzing the cutter-head vibration characteristics when the TBM bores, and obtains frictional resistance data on the shield by analyzing the data of the squeezing forces. The computer PC2 outside the tunnel predicts the jamming probability of the TBM according to the frictional resistance data, and transmits the vibration acceleration velocities, the data of the squeezing forces, and the jamming probability to the monitoring device.

Specifically, the data remotely transmitted from the computer PC2 outside the tunnel back to an analyzing center can open the reading of the vibrating-wire sensors just using Office database software; the measured cutter-head vibration data can be opened using a data analyzing module carried by the BeeData monitoring software, and further can be converted to Txt and Excel formats, and then technicians can perform data analyses in combination with the acquired tunneling parameters of the TBM, tunneling chainage, and geological conditions.

The embodiments of the present disclosure provide the method and the apparatus for monitoring interaction between surrounding rocks and the TBM in a TBM tunneling process. Firstly, the interaction between the target objects is monitored by the one or more sensors to obtain the test data, wherein the test data includes the data of the squeezing forces that the surrounding rocks apply on the shield and the vibration acceleration velocities of the cutter-head boring the rocks at the tunnel face, then the first electronic device connects the collecting module with the one or more sensors through the communication serial interface of the one or more sensors, wherein the first electronic device is provided in the tunnel, the first electronic device judges the connection state between the one or more sensors and the collecting module, the first electronic device records the connection failure information or sets the collection parameters according to the connection state, thereafter, the first electronic device judges the collection state by monitoring the collecting process, the first electronic device records collection abnormality information or performs one-time collection of data according to the collection state, the first electronic device stores the one-time collection data in the first storage folder, and finally, the second electronic device analyzes the data of the squeezing forces to judge the shield jamming probability, and transmits the vibration acceleration velocities, the data of the squeezing forces, and the shield jamming probability to the monitoring device. By adopting the autorun monitoring software, automatic storage and automatic transmission of the test data, and autoalarm in cases of software running failure are achieved, and the test data can be transmitted to the electronic device outside the tunnel at regular intervals, further, the electronic device outside the tunnel analyzes and predicts the shield jamming probability of the TBM according to the test data, and adjusts the boring parameters of the TBM, so as to solve the technical problem existing in the prior art that it is hard to achieve real-time monitoring for the rock-machine interaction in the TBM tunneling process.

Embodiment 2

Figure 4:
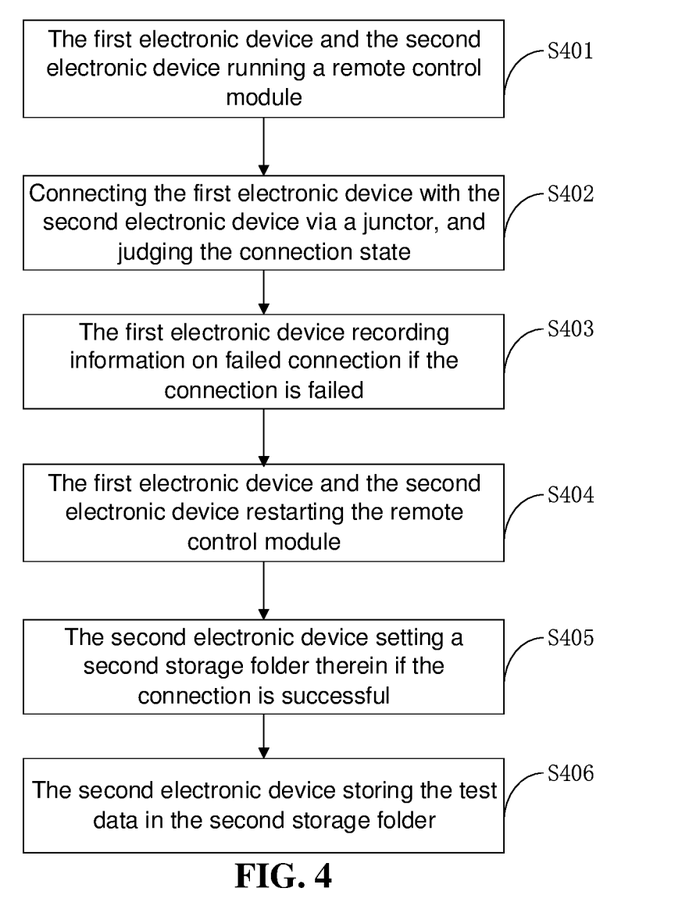
FIG. 4 is another flowchart of the method for monitoring interaction the between surrounding rocks and the TBM in a TBM tunneling process provided in the embodiment of the present disclosure.

Referring to FIG. 4, based on the preceding Embodiment 1, the method may further include following steps:

Step S401, the first electronic device and the second electronic device running a remote control module.

In the present embodiment, a program "Recorded data synchronization program from the PC1 to the PC2" for data synchronization of the computer in the operating room of the TBM and the computer in a dispatching room at an entrance to the tunnel is compiled using RoboTask software, to transmit the monitoring data, and running failure alarm information of the computer in the operating room of the TBM inside the tunnel to the computer outside the tunnel at regular intervals.

Specifically, the monitoring data is stored in the folders "D:\BGK shield strain data" and "D:\BeeData vibration data" in a disk D of the computer PC1 in the operating room of the TBM, and taking BGK as an example, a new task "Recorded data synchronization program from the PC1 to the PC2" is created, to start data automatic synchronous transmission. The data storage folder "D:\BGK shield strain data" in the computer PC1 inside the tunnel is opened. The computer PC1 and the computer PC2 open remote control software TeamViewer, and an IP address 192.168.0.67 is input into the computer PC1.

Step S402, connecting the first electronic device with the second electronic device via a junctor, and judging the connection state.

In the present embodiment, the computer PC1 inside the tunnel and the computer PC2 outside the tunnel access a TBM optical fiber communication system via a switch.

IP addresses of the computer PC1 inside the tunnel and of the computer PC2 outside the tunnel are set on the same network segment, just different in the last three bits, such that the two computers are located on the same local area network. If the IP addresses thereof are set to be on the same IP network segment as a host in the dispatching room of the TBM at the entrance to the tunnel, and a host in the operating room of the TBM inside the tunnel, the tunneling parameters (the thrust force, penetration rate, rotational speed, torque etc.) and the tunneling chainage of the TBM are also accessible. For example, the IP address of the computer host in the dispatching room of the TBM is:
IP address: 192.168.0.200
subnet mask: 255.255.255.0
The IP address of the PC1 inside the tunnel is set as:
IP address: 192.168.0.66
subnet mask: 255.255.255.0
The IP address of the PC2 outside the tunnel is set as:
IP address: 192.168.0.67
subnet mask: 255.255.255.0

Step S403, the first electronic device recording information on failed connection if the connection is failed, wherein the information includes at least one from time of connection failed and a screenshot of a running interface of the remote control module.

Specifically, if the computer PC1 inside the tunnel fails to be connected with the computer PC2 outside the tunnel, the information on the failed connection of the computer PC1 inside the tunnel with the computer PC2 outside the tunnel is recorded, including the occurrence time of the failed connection, a screenshot of interface of the TeamViewer software and so on. Meanwhile, a file "Recorded data Failure.txt" is created, to add failure information to this file each time data synchronization failure subsequently occurs.

Step S404, the first electronic device and the second electronic device restarting the remote control module.

In the present embodiment, when the computer PC1 inside the tunnel fails to be connected with the computer PC2 outside the tunnel, the TeamViewer software is automatically restarted.

Step S405, the second electronic device setting a second storage folder therein if the connection is successful.

In the present embodiment, a synchronization data storage folder "D:\BGK shield strain data" is set in the computer PC2 outside the tunnel via program control.

Step S406, the second electronic device storing the test data in the second storage folder.

Specifically, the data synchronously transmitted from the computer PC1 inside the tunnel to the computer PC2 outside the tunnel is stored in the storage folder "D:\BGK shield strain data" in the computer PC2, until synchronous transmission of all data in the present round is completed.

Embodiment 3

Figure 5:
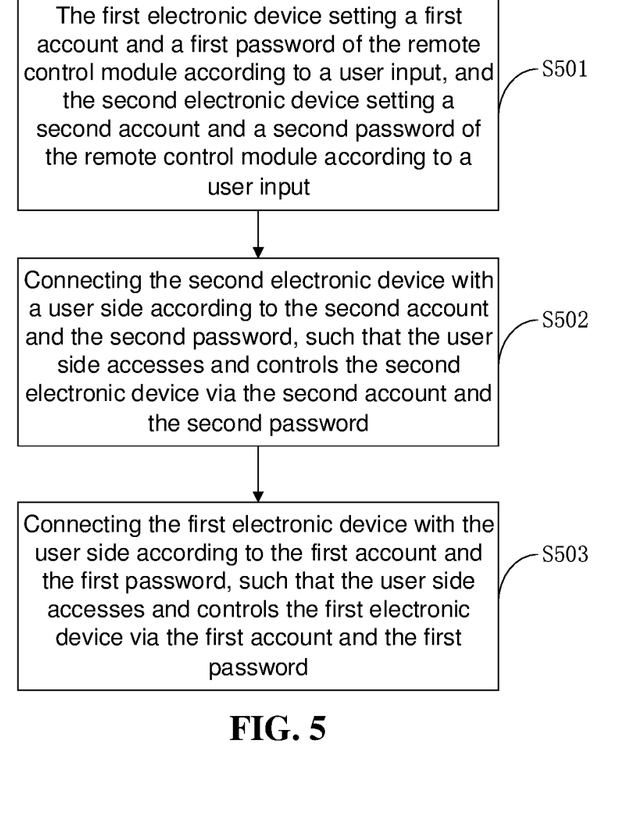
FIG. 5 is another flowchart of the method for monitoring the interaction between surrounding rocks and the TBM in a TBM tunneling process provided in the embodiment of the present disclosure.

Referring to FIG. 5, based on the preceding Embodiment 1 or Embodiment 2, the method may further include following steps:

Step S501, the first electronic device setting a first account and a first password of the remote control module according to a user input, and the second electronic device setting a second account and a second password of the remote control module according to a user input.

In the present, the computer PC2 placed in the dispatching room at the entrance of the tunnel is connected to the network. If the dispatching room at the entrance of the tunnel can be connected to Internet, the computer is directly connected to the network, in a wired or wireless manner. If the dispatching room at the entrance to the tunnel is not connected to Internet, a 4G WIFI card is mounted on this computer, to connect the computer to the network using 4G network. The notebook computer at the entrance to the tunnel and the computer inside the tunnel are each mounted with the remote control software TeamViewer, each being set with a fixed account and password.

Step S502, connecting the second electronic device with a user side according to the second account and the second password, such that the user side accesses and controls the second electronic device via the second account and the second password.

In the present embodiment, the remote control software TeamViewer is mounted on a remote client computer, Pad, or cellphone, then monitoring data synchronized on the computer PC2 at the entrance to the tunnel can be remotely accessed just by inputting the TeamViewer account and access password on the computer PC2 at the entrance to the tunnel.

Step S503, connecting the first electronic device with the user side according to the first account and the first password, such that the user side accesses and controls the first electronic device via the first account and the first password.

In the present embodiment, the computer inside the tunnel further can be remotely controlled in a nested manner, that is, just by inputting the TeamViewer account and access password on the computer PC1 inside the tunnel by remotely running the TeamViewer software mounted on the PC2 through the computer PC2 at the entrance to the tunnel, thus the computer PC1 inside the tunnel can be remotely accessed and controlled, so as to be capable of manually running the monitoring software, interrupting and adjusting the compiled unattended autorun monitoring software, and further adjusting other computer and data transmission settings.

Embodiment 4

Figure 6:
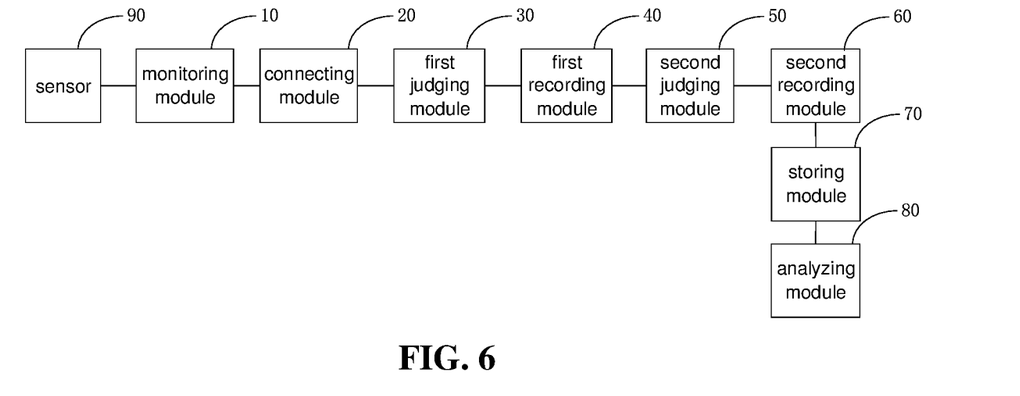
FIG. 6 is a schematic diagram of an apparatus for monitoring the interaction between surrounding rocks and the TBM in a TBM tunneling process provided in an embodiment of the present disclosure.

FIG. 6 is a schematic diagram of an apparatus for monitoring tunneling of a tunnel boring machine TBM provided in Embodiment 4 of the present disclosure.

Referring to FIG. 6, the apparatus includes a monitoring module 10, a connecting module 20, a first judging module 30, a first recording module 40, a second judging module 50, a second recording module 60, a storing module 70, and an analyzing module 80. The monitoring module 10 is configured to monitor interaction between target objects by one or more sensors to obtain test data, wherein the test data includes data of squeezing forces of surrounding rocks on a shield and a vibration acceleration velocities of a cutter-head boring rocks at a tunnel face; the connecting module 20 is configured for the first electronic device to connect a collecting module with the one or more sensors through a communication serial interface of the one or more sensors, wherein the first electronic device is provided in a tunnel; the first judging module 30 is configured for the first electronic device to judge a connection state between the one or more sensors and the collecting module; the first recording module 40 is configured for the first electronic device to record connection abnormality information or set collection parameters according to the connection state; the second judging module 50 is configured for the first electronic device to judge the collection state by monitoring a collecting process; the second recording module 60 is configured for the first electronic device to record collection abnormality information or perform one-time collection of data according to the collection state; the storing module 70 is configured for the first electronic device to store the one-time collection data in a first storage folder; the analyzing module 80 is configured for the second electronic device to analyze the data of the squeezing forces to judge a shield jamming probability, and transmit the vibration acceleration velocities, the data of the squeezing forces, and the jamming probability to a monitoring device.

Figure 7:
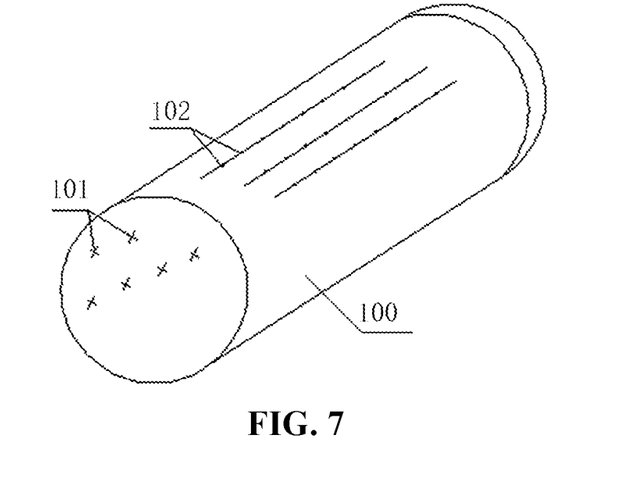
FIG. 7 is a schematic mounting diagram of one or more sensors for monitoring the interaction between surrounding rocks and the shield provided in an embodiment of the present disclosure.

Further, the apparatus further includes sensors 90. The sensors 90 include one or more sensors for the interaction between the surrounding rocks and a shield 100 and one or more sensors for interaction between the cutter-head and the rocks at the tunnel face, wherein the one or more sensors for the interaction between the surrounding rocks and the shield 100 includes at least two surface strain gauges 101 or at least one miniature pressure cell 102, and the one or more sensors for the interaction between the cutter-head and the rocks at the tunnel face are one or more cutter-head vibration sensors. Referring to FIG. 7, the at least two surface strain gauges 101 are provided on an inner surface of the shield 100 in a mode of arrayed distribution, the at least one miniature pressure cell 102 are provided on an outer surface of the shield 100, so as to measure the squeezing force that the surrounding rocks apply on the shield 100, and the cutter-head vibration sensor is provided at a back side the cutter-head.

Specifically, the sensors for the interaction between the surrounding rocks and the shield are vibrating-wire surface strain sensors or Fiber Bragg Grating (FBG) surface strain sensor. Five monitoring sections are provided on the shield. A vault, two shoulders on the left and right, two sides on the left and right, left bottom corner and right bottom corner of the inner surface of each section are each provided with one test point, and at each test point, the two vibrating-wire surface strain gauges are mounted respectively in an longitudinal direction and in a circumferential direction of the shield. When mounting, firstly, a base of each sensor is welded in a mounting position, after the welding point is cooled, the sensor is then fixed on the base using a nut carried by the sensor, and an initial reading is read using a portable vibrating-wire collector. A serial number, an initial reading, and a mounting position of each sensor are recorded. Before the TBM leaves factory, the at least one miniature pressure cell 102 further can be mounted on the outer surface of the shield to directly measure the squeezing forces that the surrounding rocks apply to the shield, each sensor is connected with the reader using a cable carried by the sensor, and the cable is extended, when it is not long enough, using a $\phi$6 mm double-core shielded cable.

A wireless tri-axial acceleration sensor is used as the cutter-head vibration sensor. One or more acceleration sensors are mounted at the back side of the cutter-head. When the cutter-head vibrates as the TBM bores, the acceleration sensor mounted at this place vibrates together with the cutter-head, and vibrating characteristics thereof reflect a vibration rule of the cutter-head. The acceleration sensor is connected with the wireless gateway receiving data via wireless signals.

An implementation principle of the technical effects produced by the apparatus provided in the embodiment of the present disclosure are the same as those of the preceding method embodiments, and for the sake of concise description, reference can be made to corresponding contents in the preceding method embodiments for contents which are not mentioned in the part of the apparatus embodiment.

Embodiment 5

Figure 8:
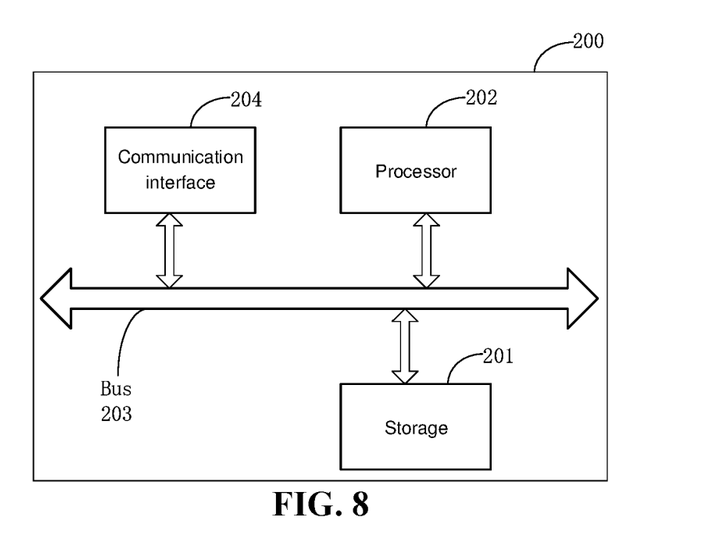
FIG. 8 shows an electronic device provided in an embodiment of the present disclosure.

As shown in FIG. 8, an electronic device 200 provided in an embodiment of the present disclosure includes a storage 201, and a processor 202, the storage 201 stores a computer program executable on the processor 202 therein, and the processor 202 implements the steps of the method provided in Embodiment 1, Embodiment 2, or Embodiment 3 in the above when executing the computer program.

Referring to FIG. 8, the electronic device 200 further includes: a bus 203 and a communication interface 204, and the processor 202, the communication interface 204, and the storage 201 are connected via the bus 203; the processor 202 is configured to execute an executable module, e.g. a computer program, stored in the storage 201.

In the above, the storage 201 may include a high-speed Random Access Memory (RAM), and also may include a non-volatile memory, for example, at least one disk memory. Communication connection between this system network element and at least one other network element is achieved through at least one communication interface 204 (possibly wired or wireless), and Internet, Wide Area Network, local network, Metropolitan Area Network and so on may be used.

The bus 203 can be an ISA bus, a PCI bus, or an EISA bus. The bus can be an address bus, a data bus, a control bus and so on. For ease of representation, the bus is represented merely with one two-way arrow in FIG. 8, but it does not mean that there is only one bus or one type of bus.

In the above, the storage 201 is configured to store programs, and the processor 202 executes the programs upon receipt of an execution instruction. The method executed by the apparatus defined by the process disclosed in any embodiment of the present disclosure in the preceding can be applied to the processor 202, or realized by the processor 202.

The processor 202 may be an integrated circuit chip, with a signal processing function. In an implementation process, various steps of the above methods may be achieved by an integrated logic circuit of hardware in the processor 202 or instruction in a software form. The above processor 202 may be a general-purpose processor, including Central Processing Unit ("CPU" for short), Network Processor ("NP" for short), etc., and also may be a digital signal processor ("DSP" for short), an application-specific integrated circuit ("ASIC" for short), a Field-Programmable Gate Array ("FPGA" for short) or other programmable logic devices, discrete gates, transistor logic devices, or discrete hardware components that can realize or implement various methods, steps, and logic blocks disclosed in the embodiments of the present disclosure. The general-purpose processor may be a microprocessor or the processor also may be any conventional processor and so on. The steps in the method disclosed in the embodiments of the present disclosure may be directly carried out and completed by hardware decoding processor, or carried out and completed by hardware and software modules in the decoding processor. The software module may be located in a mature storage medium in the art such as a random access memory, a flash memory, a read-only memory, a programmable read-only memory or an electrically erasable programmable memory, and register. The storage medium is located in the storage 201, and the processor 202 reads information in the storage 201, and is combined with hardware thereof to complete the steps of the above method.

Embodiment 6

An embodiment of the present disclosure provides a computer readable medium having non-volatile program codes executable by a processor, and the program codes enable the processor to execute the method provided in the above Embodiment 1, Embodiment 2, or Embodiment 3.

A computer program product provided in an embodiment of the present disclosure includes a computer readable storage medium in which a program code is stored, and instructions included in the program code can be used to execute the methods described in the method embodiments in the preceding. Reference can be made to the method embodiments for specific implementation, which will not be repeated redundantly herein.

A person skilled in the art could clearly know that for the sake of convenience and conciseness of description, reference can be made to corresponding processes in the above method embodiments for specific operation processes of the system and apparatus described in the preceding, and they will not be repeated redundantly herein.

In addition, in the description of the embodiments of the present disclosure, unless otherwise specified and defined explicitly, terms "mount", "join", and "connect" should be construed in a broad sense, for example, a connection can be a fixed connection, a detachable connection, or an integrated connection; it can be a mechanical connection, and also can be an electrical connection; it can be a direct connection, an indirect connection through an intermediate medium, or an inner communication between two elements. For a person ordinarily skilled in the art, specific meanings of the above-mentioned terms in the present disclosure can be understood according to specific circumstances.

If the function is realized in a form of software functional unit and is sold or used as an individual product, it can be stored in one computer readable storage medium. Based on such understanding, the technical solution of the present disclosure essentially or the part making contribution with respect to the prior art or part of this technical solution can be embodied in a form of software product, and this computer software product is stored in one storage medium, including several instructions used to make one computer device (which can be a personal computer, a sever or a network device etc.) execute all or some of the steps of the methods of various embodiments of the present disclosure. The aforementioned storage medium includes various media in which program codes can be stored, such as U disk, mobile hard disk, Read-Only Memory (ROM), Random Access Memory (RAM), diskette and compact disk.

In the description of the present disclosure, it should be indicated that orientational or positional relationships indicated by terms "center", "upper", "lower", "left", "right", "vertical", "horizontal", "inner", "outer" and so on are based on orientational or positional relationships as shown in the accompanying drawings, merely for facilitating describing the present disclosure and simplifying the description, rather than indicating or suggesting that related devices or elements have to be in the specific orientation or configured and operated in a specific orientation, and therefore, they should not be construed as limiting the present disclosure. Besides, terms "first", "second", and "third" are merely for descriptive purpose, but should not be construed as indicating or implying importance in the relativity.

Finally, it should be noted that the above embodiments are merely specific embodiments of the present disclosure, for illustrating the technical solutions of the present disclosure, rather than limiting the present disclosure, and the scope of protection of the present disclosure should not be limited thereto. While the detailed description is made to the present disclosure with reference to the preceding embodiments, those ordinarily skilled in the art should understand that within the technical scope disclosed in the present disclosure, anyone skilled in and familiar with the present technical field still can make modifications or readily envisage changes for the technical solutions recited in the preceding embodiments, or make equivalent substitutions to some of the technical features therein; these modifications, changes, or substitutions do not make the essence of the corresponding technical solutions depart from the spirit and scope of the technical solutions of the embodiments of the present disclosure, and they all should be covered within the scope of protection of the present disclosure. Therefore, the scope of protection of the present disclosure should be based on the scope of protection of the claims.

What is claimed is:

1. A method for monitoring interaction between surrounding rocks and a full face tunnel boring machine (TBM) in a TBM tunneling process, wherein the method comprises steps of:

monitoring, by one or more sensors, a first interaction between target objects, to obtain test data, wherein the test data comprises data of squeezing forces that the surrounding rocks apply on a shield of the TBM and vibration acceleration velocities of a cutter-head boring rocks at a tunnel face;

connecting a collecting module with the one or more sensors through a communication serial interface of the one or more sensors by a first electronic device, wherein the first electronic device is provided in a tunnel;

judging a connection state between the one or more sensors and the collecting module by the first electronic device;

recording connection abnormality information or setting collection parameters according to the connection state between the one or more sensors and the collecting module by the first electronic device;

judging a collection state by monitoring a collecting process by the first electronic device;

recording collection abnormality information or performing one-time collection of a first data according to the collection state by the first electronic device;

storing into a first storage folder the first data obtained from the one-time collection of the first data by the first electronic device; and analyzing the data of the squeezing forces to judge a jamming probability by a second electronic device, and transmitting the vibration acceleration velocities, the data of the squeezing forces, and the jamming probability to a monitoring device, wherein said recording the connection abnormality information or the setting collection parameters according to the connection state by the first electronic device comprises:

if the connection state is failed, the first electronic device recording the connection abnormality information that the connection state is failed, wherein the connection abnormality information comprises: at least one from a serial number of the communication serial interface of the one or more sensors where the connection state is failed, a screenshot of a running interface of the collecting module, and time when the connection state is failed, and restarting a monitoring software program, so that the first electronic device re-connects the collecting module with the one or more sensors through the communication serial interface of the one or more sensors; or if the connection state is successful, the first electronic device setting the first storage folder, one-time collection duration, and a collection frequency, and the method for monitoring the interaction between the surrounding rocks and the TBM in the TBM tunneling process further comprises:

operating a remote control module by the first electronic device and the second electronic device, wherein the second electronic device is provided in the tunnel;

connecting the first electronic device with the second electronic device via a junctor, and judging the connection state;
the first electronic device recording the connection abnormality information or the setting collection parameters according to the connection state,
if the connection state is failed, the first electronic device recording the connection abnormality information that the connection state is failed, wherein the connection abnormality information comprises at least one from the time when the connection state is failed and a screenshot of a running interface of the remote control module; and the first electronic device and the second electronic device restarting the remote control module; or
if the connection state is successful, the second electronic device setting a second storage folder; and the second electronic device storing the test data in the second storage folder.

2. The method for monitoring the interaction between the surrounding rocks and the TBM in the TBM tunneling process according to claim 1, wherein the test data further comprises tunneling parameters of the TBM, tunneling chainage, and geological conditions.

3. The method for monitoring the interaction between the surrounding rocks and the TBM in the TBM tunneling process according to claim 1, wherein the first electronic device recording the collection abnormality information or performing the one-time collection of the first data according to the collection state comprises:
the first electronic device recording the collection abnormality information if collection abnormality occurs, wherein the collection abnormality information comprises: at least one from the screenshot of the running interface of the collecting module, the serial number of the communication serial interface of the one or more sensors, and time when the collection abnormality happens, and
the first electronic device restarting the collecting module; or
the first electronic device performing the one-time collection of the first data according to the one-time collection duration to obtain the first data of the one-time collection if no abnormality in the one-time collection of the first data.

4. The method for monitoring the interaction between the surrounding rocks and the TBM in the TBM tunneling process according to claim 1,
wherein the junctor comprises: a switch and a TBM optical fiber communication system;
the first electronic device and the second electronic device are connected to each other via the switch and the TBM optical fiber communication system; and
IP addresses of the first electronic device and of the second electronic device are set on a same network segment, and the IP addresses of the first electronic device and of the second electronic device are different in last three bits.

5. The method for monitoring the interaction between the surrounding rocks and the TBM in the TBM tunneling process according to claim 1, further comprising:
the first electronic device setting a first account and a first password of the remote control module according to a user input, and the second electronic device setting a second account and a second password of the remote control module according to the user input;
the second electronic device connecting with a user side according to the second account and the second password, such that the user side accesses and controls the second electronic device via the second account and the second password; and
the first electronic device connecting with the user side according to the first account and the first password, such that the user side accesses and controls the first electronic device via the first account and the first password.

6. The method for monitoring the interaction between the surrounding rocks and the TBM in the TBM tunneling process according to claim 1,
wherein said recording the connection abnormality information or the setting collection parameters by the first electronic device according to the connection state comprises:
the first electronic device recording the connection abnormality information that the connection state is failed, if connection abnormality occurs and the connection state is still unsuccessful after a program tries to reconnect the one or more sensors with the collecting module 3 times, wherein the connection abnormality information comprises: at least one from the serial number of the communication serial interface of the one or more sensors where the connection state is failed, the screenshot of the running interface of the collecting module, and the time of the connection state is failed; or
the first electronic device setting the first storage folder, the one-time collection duration, and the collection frequency if the connection state is successful.

7. An apparatus for monitoring interaction between surrounding rocks and a full face tunnel boring machine (TBM) in a TBM tunneling process, wherein the apparatus comprises:
a monitoring module, configured to monitor a first interaction between target objects by one or more sensors to obtain test data,
wherein the test data comprises data of squeezing forces that the surrounding rocks apply to a shield of the TBM and vibration acceleration velocities of a cutter-head boring rocks at a tunnel face;
a connecting module, configured for a first electronic device to connect a collecting module with the one or more sensors through a communication serial interface of the one or more sensors,
wherein the first electronic device is provided in a tunnel;
a first judging module, configured for the first electronic device to judge a connection state between the one or more sensors and the collecting module;
a first recording module, configured for the first electronic device to record connection abnormality information or set collection parameters according to the connection state;
a second judging module, configured for the first electronic device to judge a collection state by monitoring a collecting process;
a second recording module, configured for the first electronic device to record collection abnormality information or perform one-time collection of a first data according to the collection state;
a storing module, configured for the first electronic device to store into a first storage folder the first data obtained from the one-time collection; and
an analyzing module, configured for a second electronic device to analyze the data of the squeezing forces to judge a jamming probability, and transmit to a monitoring device the vibration acceleration velocities, the data of the squeezing forces, and the jamming probability;

an operation module, configured for the first electronic device and the second electronic device to operate a remote control module, wherein the second electronic device is provided in the tunnel;

a third judging module, configured for the first electronic device to be connected with the second electronic device via a junctor, and judge the connection state;

a third recording module, configured for the first electronic device to record the connection abnormality information or the set collection parameters according to the connection state, if the connection state is failed, the connection abnormality information that the connection is failed, wherein the connection abnormality information comprises at least one from time when the connection state is failed and a screenshot of a running interface of the remote control module;

a restarting module, configured for the first electronic device and the second electronic device to restart the remote control module;

a setting module, configured for the second electronic device to set a second storage folder therein if the connection state is successful; and a data storage module, configured for the second electronic device to store the test data in the second storage folder, wherein the first recording module is configured for:

the first electronic device to record the connection abnormality information or the set collection parameters according to the connection state, if the connection state is failed, the connection abnormality information that the connection state is failed, wherein the connection abnormality information comprises: at least one from a serial number of the communication serial interface of the one or more sensors where the connection state is failed, a screenshot of a running interface of the collecting module, and the time when the connection state is failed, and to restart a monitoring software program, so that the first electronic device re-connects the collecting module with the one or more sensors through the communication serial interface of the one or more sensors; or the first electronic device to set the first storage folder, one-time collection duration, and a collection frequency if the connection state is successful.

8. The apparatus for monitoring the interaction between the surrounding rocks and the TBM in the TBM tunneling process according to claim 7, wherein the apparatus further comprises first sensors;

the first sensors for a second interaction between the surrounding rocks and the shield of the TBM and for a third interaction between the cutter-head boring rocks and the surrounding rocks at the tunnel face, wherein the first sensors for the second interaction between the surrounding rocks and the shield comprise at least two surface strain gauges or at least one miniature pressure cell, and the first sensors for the third interaction between the cutter-head boring rocks and the surrounding rocks at the tunnel face are one or more cutter-head vibration sensors;

the at least two surface strain gauges are provided on an inner surface of the shield in a mode of arrayed distribution;

the at least one miniature pressure cell is provided on an outer surface of the shield, so as to measure the data of the squeezing forces that the surrounding rocks apply to the shield; and each of the one or more cutter-head vibration sensors is provided at a back side of the cutter-head boring rocks.

9. An electronic device, comprising a storage and a processor, with the storage storing a computer program executable on the processor, wherein the processor implements by executing the computer program a method for monitoring interaction between surrounding rocks and a full face tunnel boring machine (TBM) in a TBM tunneling process, wherein the method comprises steps of:

monitoring, by one or more sensors, a first interaction between target objects, to obtain test data, wherein the test data comprises data of squeezing forces that the surrounding rocks apply on a shield of the TBM and vibration acceleration velocities of a cutter-head boring rocks at a tunnel face;

connecting a collecting module with the one or more sensors through a communication serial interface of the one or more sensors by a first electronic device, wherein the first electronic device is provided in a tunnel;

judging a connection state between the one or more sensors and the collecting module by the first electronic device;

recording connection abnormality information or setting collection parameters according to the connection state between the one or more sensors and the collecting module by the first electronic device;

judging a collection state by monitoring a collecting process by the first electronic device;

recording collection abnormality information or performing one-time collection of a first data according to the collection state by the first electronic device;

storing into a first storage folder the first data obtained from the one-time collection of the first data by the first electronic device; and analyzing the data of the squeezing forces to judge a jamming probability by a second electronic device, and transmitting the vibration acceleration velocities, the data of the squeezing forces, and the jamming probability to a monitoring device, wherein said recording the connection abnormality information or the setting collection parameters according to the connection state by the first electronic device comprises:

if the connection state is failed, the first electronic device recording the connection abnormality information that the connection state is failed, wherein the connection abnormality information comprises: at least one from a serial number of the communication serial interface of the one or more sensors where the connection state is failed, a screenshot of a running interface of the collecting module, and time when the connection state is failed, and restarting a monitoring software program, so that the first electronic device re-connects the collecting module with the one or more sensors through the communication serial interface of the one or more sensors; or if the connection state is successful, the first electronic device setting the first storage folder, one-time collection duration, and a collection frequency, and the method for monitoring the interaction between the surrounding rocks and the TBM in the TBM tunneling process further comprises:

operating a remote control module by the first electronic device and the second electronic device, wherein the second electronic device is provided in the tunnel;

connecting the first electronic device with the second electronic device via a junctor, and judging the connection state;

the first electronic device recording the connection abnormality information or the setting collection parameters according to the connection state, if the connection state is failed, the first electronic device recording the connection abnormality information that the connection state is failed, wherein the connection abnormality information comprises at least one from the time when the connection state is failed and a screenshot of a running interface of the remote control module; and the first electronic device and the second electronic device restarting the remote control module; or if the connection state is successful, the second electronic device setting a second storage folder; and the second electronic device storing the test data in the second storage folder.

\* \* \* \* \*